United States Patent [19]

Evans et al.

[11] Patent Number: 4,585,848
[45] Date of Patent: Apr. 29, 1986

[54] FLUOROSILICONE RUBBER COMPOSITION, PROCESS AND POLYMER

[76] Inventors: Edwin R. Evans, 9 Rodriso Ct.; Makoto Matsumoto, 6 St. James London Square Apt., both of Clifton Park, N.Y. 12065

[21] Appl. No.: 443,545

[22] Filed: Nov. 22, 1982

Related U.S. Application Data

[63] Continuation of Ser. No. 253,282, Apr. 9, 1981, abandoned.

[51] Int. Cl.$^4$ .............................................. C08G 77/06
[52] U.S. Cl. ...................................... 528/15; 528/31; 528/32; 556/454
[58] Field of Search ............................ 528/15, 32, 31; 556/454

[56] References Cited

U.S. PATENT DOCUMENTS

| | | | |
|---|---|---|---|
| 2,938,009 | 5/1960 | Lucas | 260/37 |
| 3,159,601 | 12/1964 | Ashby | 260/46.5 |
| 3,159,662 | 12/1964 | Ashby | 260/448.2 |
| 3,220,972 | 11/1965 | Lamoreaux | 260/46.5 |
| 3,635,743 | 1/1972 | Smith | 106/288 Q |
| 3,847,848 | 11/1974 | Beers | 260/18 S |
| 4,029,629 | 6/1977 | Jerman | 260/37 SB |
| 4,041,110 | 7/1977 | Krueger et al. | 260/938 |
| 4,061,609 | 12/1977 | Bobear | 260/9 |
| 4,122,247 | 10/1978 | Evans | 528/14 |
| 4,157,337 | 6/1979 | Evans | 260/448.2 E |
| 4,256,870 | 3/1981 | Eckberg | 528/15 |

*Primary Examiner*—Melvyn I. Marquis

[57] ABSTRACT

High strength solvent resistant rubber compositions comprise a vinyl terminated fluorosilicone copolymer gum having a controlled, low amount of backbone vinyl unsaturation, a conventional platinum curing agent, and a crosslinker containing a least two Si-H bonds.

12 Claims, No Drawings

FLUOROSILICONE RUBBER COMPOSITION, PROCESS AND POLYMER

This is a continuation of application Ser. No. 253,282 filed Apr. 9, 1981 and now abandoned.

The present invention relates to fluorosilicone rubber compositions, to methods for curing them, and to fluorosilicone polymers uniquely suitable for use in such compositions.

BACKGROUND OF THE INVENTION

Curable fluorosilicone rubber compositions are described in commonly assigned Jeram, U.S. Pat. No. 4,029,629 and 4,041,010. They are fluids, typically with viscosities in the range of 1,000 to 200,000 centipoise at 25° C., using a vinyl terminated base polymer with a fluorosilicone content within the range of 5 to 98 mole percent. The compositions cure by means of a platinum catalyzed hydrosilylation reaction, and organic hydroperoxides, alkenyl-containing cyclic polysiloxanes and the like, serve as cure inhibitors.

The vinyl terminated base polymers have been disclosed to have the general formula:

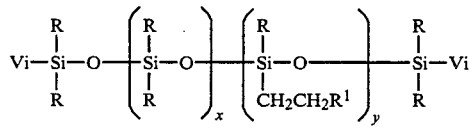

wherein Vi is vinyl, R is selected from alkyl of from 1 to 8 carbon atoms or phenyl, $R^1$ is perfluoroalkyl of from 1 to 8 carbon atoms, x and y are at least 1 and, as mentioned, the concentration of the siloxy unit taken y times varies from 5 to 98 mole percent.

The vinyl terminated base polymer is prepared in large scale by the copolymerization of methyl-3,3,3-trifluoropropylsiloxane cyclic trimer and octamethylcyclotetrasiloxane using an alkali metal hydroxide, preferably potassium hydroxide. Polymerization is of an equilibration type, although it may also use complex cation catalysts, see, e.g., Evans U.S. Pat. No. 4,122,247 and 4,157,337. The vinyl end groups are established through the use of vinyl chain stoppers such as $CH_2=CHSi(CH_3)_2O-Si(CH_3)_2-O-_{20}$-$Si(CH_3)_2CH=CH_2$ or $CH_2=CHSi(CH_3)_2-O$ $Si(CH_3)_2-O-]_{38}Si(CH_3)(CF_3CH_2CH_2)-O-_{23}$-$Si(CH_3)_2CH=CH_2$, and the like, in known ways, and the amount of chain stopper controls the desired viscosity, also as is well known.

Although when properly compounded and cured, the prior art vinyl terminated based polymers provide good mechanical properties, they do not meet all of the requirements specified for the manufacture of the highest quality electrical connectors.

It has now been discovered that the prior art base polymers contain a small, unexpected amount of unsaturation on the polymer backbone, in addition to that to be expected, i.e., on the ends. It has been further discovered that such backbone unsaturation is detrimental toward the development of optimum mechanical properties, in that it leads to a tightly cured matrix which, in turn, adversely affects tensile strength, tear resistance and resilience.

Backbone unsaturation arises because fluorosilicone cyclic trimer used to make the base polymer in the above-mentioned equilibration process has been found to contain, or to produce by a side reaction in the presence of alkali metal hydroxide at elevated temperatures, a vinyl containing trimer, having the formula:

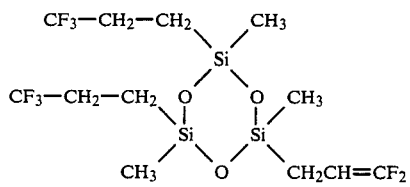

Typically, the amount of such material in the cyclic trimer is never less than 1.5% by weight. It has now been found that using less than conventional amounts of base catalyst, and lower than conventional temperatures, can reduce the vinyl byproduct content—3,3-difluoropropenyl type unsaturation—to less than 1, and even down to 0 to 0.4 weight percent. If the low vinyl trimer-containing product is then copolymerized with cyclic tetramer following conventional procedures, there will be obtained a new base polymer with little or no backbone unsaturation. This is uniquely suitable for providing solvent resistant fluorosilicone rubber containing compositions with the best combination of physical properties.

DESCRIPTION OF THE INVENTION

According to this invention, there are provided solvent-resistant room temperature vulcanizable silicone rubber compositions comprising:
(A) a mixture composed of
(i) a vinyl-containing base polymer of the formula:

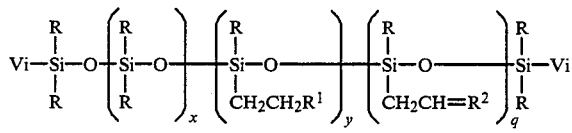

where Vi is vinyl, R is alkyl of from 1 to 8 carbon atoms or phenyl, $R^1$ is perfluoroalkyl of from 1 to 8 carbon atoms, $R^2$ is perfluoroalkylidene of from 1 to 8 carbon atoms, x and y are each at least 1, q is 0 or no more than 0.01 times y, the viscosity of the polymer varies from 1,000 to 200,000 centipoise at 25° C. and the concentration of siloxy units taken y times varies from 5 to 98 mole percent; and
(ii) a platinum catalyst, and
(B) alone, or in admixture with base polymer (i), (iii) a cross-linking polymer selected from (a) a resin having

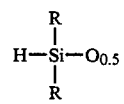

and $SiO_2$ units where the R to Si ratio varies from 1.0 to 2.7; (b) a resin having

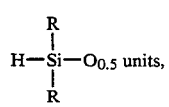

SiO₂ units and RR³SiO units where the R to Si ratio varies from 1.2 to 2.7; (c) a polymer of the formula:

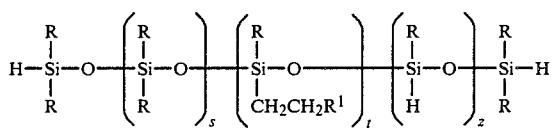

where R and R¹ are as previously defined, s is at least 1, t and z may be zero or a positive integer and the viscosity of the polymer varies from 10 to 1,000 centipoise at 25° C., where the concentration of siloxy units taken t times varies from 0 to 75 mole percent, and R³ is alkyl of 1 to 8 carbon atoms or —CH₂CH₂R¹, or a mixture of (a), (b) and (c), the total composition (A) and (B) comprising per 100 parts by weight of base polymer (i), from 0.1 to 50 parts per million of platinum catalyst (ii), and from 1 to 50 parts of cross-linking polymer (iii).

Also contemplated is a method for forming a solvent resistant silicone elastomer comprising (a) mixing components (A) and (B), (A) and (B) being as defined above, and (b) allowing the mixture to cure.

In another aspect, novel base polymers, uniquely suitable for making such compositions are provided, the base polymers having the formula:

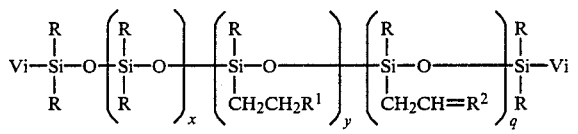

wherein Vi is vinyl, R is alkyl of from 1 to 8 carbon atoms or phenyl, R¹ is perfluoroalkyl of from 1 to 8 carbon atoms, R² is perfluoroalkylidene of from 1 to 8 carbon atoms, x and y are each at least 1 and q is 0 or no more than 0.01 times y, the viscosity of the polymer varies from 1,000 to 200,000 centipoise at 25° C. and the concentration of siloxy units taken y times varies from 5 to 98 mole percent.

The platinum catalyst may be a platinum deposit on a solid carrier, such as charcoal or gamma-aluminum or it can be a solubilized platinum catalyst such as, chloroplatinic acid or any of the well known platinum complexes.

This composition will cure at room temperature or at a much faster rate at elevated temperatures to produce a solvent resistant silicone elastomer. It is preferable that there be incorporated into the composition from 5 to 100 parts of a filler so as to give the final cured silicone elastomer high tensile strength and elongation so that the material will have strength properties comparable to that of heat vulcanizable silicone rubber compositions. More preferablly, the filler is selected from the class consisting of fumed silica and precipitated silica which has been treated with a silicone compound so as to make it hydrophobic and allow it to impart to the silicone rubber composition enhanced physical properties, and specifically tensile strength. Thus, the filler may be treated with a cyclicpolysiloxane or a silyl nitrogen compound as is well known in the art and will be explained below.

The composition may also include a cure inhibitor to allow the composition to have a sufficiently long work life at room temperature that is desirable for the particular fabrication technique in which the composition will be used. There may be incorporated into the composition various additives such as, heat stability additives, for instance, iron oxide.

The process for forming the silicone elastomer involves mixing the vinyl-containing polymer with the filler incorporated in them, the platinum catalyst with an inhibitor, if any, and the heat stabilizing agent in one component. The hydride cross-linking agent is packaged separately in a second component and this can include a content of vinyl-containing polymer and filler, as well as the cure inhibitor. When it is desired to cure the composition, the two components are simply mixed together and the composition (depending on the amount of inhibitor that has been incorporated in it and depending on the temperature at which the cure takes place) will be allowed to cure to a solvent resistant silicone elastomer.

By means of the above composition, there is provided a solvent resistant silicone rubber composition with appropriate low viscosity properties which can be cured either at room temperature or at elevated temperatures if a shorter cure cycle is desired. Thus, depending on the temperature and the amount of inhibitor that is utilized, the above composition in the uncured state and having the desirable low viscosity may cure in a period of time varying anywhere from 1 minute to 5 hours or more, as is desired in the processing and fabricating technique that the composition is utilized in.

The base polymer (i) above is one of the basic ingredients in the present composition where R is selected from alkyl radicals of 1 to 8 carbon atoms and phenyl is preferably an alkyl radical of 1 to 4 carbon atoms such as, methyl, ethyl, etc. The R¹ radical may be any perfluoroalkyl radical of 1 to 8 carbon atoms but is most preferably, perfluoromethyl. Generally, for x and y, the x may vary from 1 to 1,000 and y may vary from 1 to 1,000. These symbols must be at least 1 and can have any values such that the viscosity of the fluid generally varies from 1,000 to 500,000 centipoise at 25° C., and preferably varies from 1,000 to 200,000 centipoise at 25° C. Most preferably, the viscosity of the above polymer of formula (1) varies from 20,000 to 85,000 centipoise at 25° C.

Another important limitation in the base polymer (i) is that the alkyl perfluoroalkylethylene siloxy substituent units taken y times must be present in the polymer at a concentration of generally anywhere from 5 to 98 mole percent and preferably 26 to 29 mole percent.

The base polymers are prepared by well-known procedures, see, e.g., U.S. Pat. No. 4,029,629. Conveniently, there is equilibrated a mixture of an alkyl- or phenylperfluoropropylsiloxane cyclic trimer and octamethyl cyclotetrasiloxane with an alkali metal hydroxide, preferably potassium hydroxide. The polymerization can also be conducted in the presence of a complex cation catalyst. In any event, however, the fluorosilicone trimer must contain no more than 1.0 weight percent, and more preferably from 0 to 0.4 weight percent of any vinyl containing trimer byproduct, e.g., of the type set forth by formula above.

To control the end viscosity of the base polymer, divinyl chain stoppers are included in the mixture in accordance with standard practice.

The mixture is heated in the presence of the catalyst above 100° C. for 5 to 20 hours, until equilibration is reached. The mixture is cooled and the catalyst is neutralized, e.g., with tris(2-chloroethyl)phosphite or other standard materials. Then the mixture is devolatilized to remove cyclics.

Until ready for use, the base polymer is kept separate from the catalyst mixed with the cross-linking agent as is known in this art. The catalyst can be dispersed in the base polymer, the cross-linker can be dispersed in a second portion of the base polymer, but contact therebetween too soon will cause premature cure. The cross-linker may be any of the known hydride containing resins or the hydrogen polysiloxane polymer or mixtures thereof. These are made by techniques outlined, for example in the above-mentioned U.S. Pat. No. 4,029,629, which is incorporated by reference herein to avoid unnecessarily detailed description.

The term "platinum catalyst" as defined herein not only means platinum metal deposited on a solid carrier but means platinum in any form and more specifically in the form of a platinum complex. These platinum complex catalysts are preferred because the platinum is more soluble in the reacting components and depending on which platinum complex catalyst is used, usually results in a faster reaction rate. Such a platinum compound catalyst may be, for instance, chloroplatinic acid. Preferred platinum catalysts are those platinum compound catalysts which are soluble in the present reaction mixture. The platinum compound can be selected from those having the formula $(PtCl_2.Olefin)_3$ and $H(PtCl_3.Olefin)$ as described in Ashby U.S. Pat. No. 3,159,601. The olefin shown in the previous two formulas is preferably alkenylene having from 2 to 8 carbon atoms, cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

Another platinum catalyst is the platinum chloride cyclopropane complex $(PtCl_2C_3H_4)$ described in Ashby U.S. Pat. No. 3,159,522.

Still another platinum catalyst is formed from chloroplatinic acid with up to 2 moles per gram of platinum of a member selected from the class consisting of alcohols, ethers, aldehydes and mixtures of the above as described in Lamoreaux U.S. Pat. No. 3,220,972.

The above ingredients produce solvent resistant silicone rubber. However, to increase the tensile strength and toughness of the final cured silicone elastomer, it is preferred to incorporate a filler. Illustrative of the many fillers which can be employed are titanium dioxide, lithopone, zinc oxide, calcium silicate, silica aerogel, barium oxide, diatomaceous earth, calcium carbonate, fumed silica, silazane-treated silica, precipitated silica, glass fibers, magnesium oxide, chromic oxides, zirconium oxides, aluminum oxide, alpha quartz, calcined clay, asbestos, carbon graphite, cork, cotton, synthetic fibers, etc. It has been found that fumed silica and precipitated silica are the best fillers for the present composition in terms of optimizing the cured compositions tensile strength and toughness and the most advantageous and optimum results are obtained with fumed silica which has been treated. Thus, the silica fillers may be treated, for example, as disclosed in U.S. Pat. No. 2,938,009, Lucas, with cyclicpolysiloxanes. Silazane treated fillers in accordance with the disclosure of Smith, U.S. Pat. No. 3,635,743 and Beers, U.S. Pat. No. 3,847,848 are preferred.

In preparing the composition, Part A is conveniently made by taking all or part of base polymer (i) and adding filler, if desired, and platinum catalyst (ii). Part B is made by using the cross-linker (iii) alone, but more preferably, using part of the base polymer, adding the cross-linker (iii) and any work life extender, e.g., 100 to 10,000 parts per million of a vinyl-unsaturated cyclic polysiloxane, dialkyl maleate, dialkyl maleimide, a hydroperoxide, or the like. The latter promotes work life because, after mixing Parts A and B, depending on temperature, the compositions cure in from a matter of hours at 25° C. to a matter of a few minutes at 100° C., or more. These factors are well known to those skilled in the art, the only requirement being the need to observe the amounts of materials set forth above and in the appended claims.

DESCRIPTION OF THE PREFERRED EMBODIMENTS

The following examples illustrate the compounds, compositions and processes of the present invention. They are illustrative and are not to be construed to limit the claims in any manner whatsoever.

EXAMPLES 1–3

Vinyl terminated base polymers comprising 28 mole percent of 3,3,3-trifluroopropylmethylsiloxy units and 72 mole percent of dimethylsiloxy units are prepared by the following general procedure:

A clean dry vessel is charged with 24 g. of methyl-3,3,3-trifluoropropylsiloxane cyclic trimer and 300 g. of octamethylcyclotetrasiloxane (includes 50 g. excess for drying). The vessel is heated to 120° C. and the excess cyclic tetramer is sparged out with nitrogen to azeotropically reduce the moisture content to less than 10 ppm. water. There is added 4½ to 6 parts per 100 parts of cyclic trimer of a chain stopper of the formula

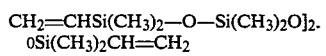

which is sufficient to provide ultimately a devolatilized polymer with a viscosity in the range of 20,000 to 80,000 centipoise at 25° C. A catalyst comprising 0.013 g. of potassium hydroxide colloided (milled with high shear mixing) into the cyclic tetramer is prepared. This has an average particle size of 25 to 100 microns, and is dried over molecular sieve 4A°. The catalyst is added and the mixture exotherms. After the exotherm subsides, the vessel temperature is increased to 160° C. and held for 6 hours. The catalyst is neutralized by adding tris(2-chloroethyl)phosphite, and the polymer is devolatilized to less than 2.5 weight percent volatiles. The clear polymer, usually about 420 g. (80% recovered yield) has a density of about 1.101 at 25° C.

Three polymers with different viscosities and two different backbone unsaturations are prepared from two batches of the perfluoroalkylcyclic trimer and with different amounts of the chain terminating agent. They have the following general formula:

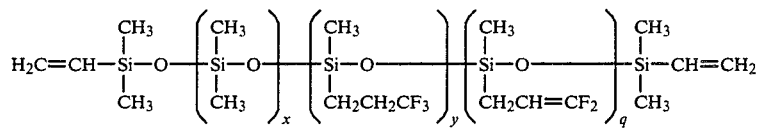

| Base Polymer Example | x | y | q | Olefin Compound in Trimer, % | Viscosity (cps at 25° C.) |
|---|---|---|---|---|---|
| 1 | 72 | 27.94 | .056 | 0.2 | 85,000 |
| 2 | 72 | 27.94 | .056 | 0.2 | 26,400 |
| 3 | 72 | 27.80 | .196 | 0.7 | 52,000 |

EXAMPLES 4–6

Three batches of curable compositions are prepared from the base polymers of Examples 1–3 by the following general procedure:

Part A

In a doughmixer is charged 100 parts of the base polymer followed by 15 parts of a first silazane treated silica filler, and 5 parts of a second silazane treated silica filler. The first silica filler is a fumed silica which is first treated with 1,1,3,3,5,5,7,7-octamethylcyclotetrasiloxane, devolatilized, then treated with hexamethyldisilazane. The second silica filler is a precipitated silica which is first treated with the same cyclic siloxane, devolatilized, then treated with hexamethyldisilazane. After the mixture becomes uniform, it is hot mixed for two hours at 120° C. under a nitrogen gas atmosphere. It is cooled to under 50° C. and there is then added 0.08 parts of a platinum catalyst comprising chloroplatinic acid complexed with 2 moles per gram atom of platinum of alcohol (Lamoreaux, U.S. Pat. No. 3,220,972).

Part B

This is made in accordance with Part A except that 2.1 parts of a branched hydride of the general formula

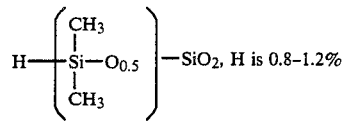

and 0.09 parts of diallylmaleate are added instead of the platinum catalyst after hot mixing. The branched hydride is the hydrolysis product of 4 moles of dimethylchlorosilane and 1 mole of ethyl orthosilicate.

Rubber slabs with ASTM dimensions are prepared by mixing Part A and Part B in a 1:1 ratio and curing in the mold for 1 hour at 300° F. The slab is then cured for 8 hours at 400° F. and checked for physical properties. The results of curing the respective formulations are as follows:

| Example | Base Polymer of Example | Shore A Hardness | Tensile Strength, psi | Elongation, % | Tear Strength |
|---|---|---|---|---|---|
| 4 | 1 | 44 | 785 | 470 | 122 |
| 5 | 2 | 46 | 807 | 400 | 102 |
| 6 | 3 | 46 | 721 | 360 | 89 |

High strength fluorosilicone solvent resistant rubber compositions are obtained.

The foregoing patents are incorporated herein by reference. Obviously, many variations will suggest themselves to those skilled in this art in light of the above, detailed description. All such variations are within the full intended scope of the appended claims.

We claim:

1. In a solvent resistant room temperature vulcanizable silicone rubber composition comprising
   (A) a mixture composed of
      (i) a vinyl-terminated base polymer, said base polymer being prepared by copolymerization of methyl-3,3,3-trifluoropropylsiloxane cyclic trimer and octamethylcyclotetrasiloxane, and the viscosity of said base polymer varies from 1,000 to 200,000 centipoise at 25° C., and
      (ii) a platinum catalyst, and
   (B) alone, or in admixture with base polymer (i),
      (iii) a cross-linking polymer selected from
         (a) a resin having

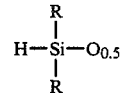

and $SiO_2$ units where the R to Si ratio varies from 1.0 to 2.7; (b) a resin having

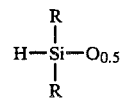

units, $SiO_2$ units and $RR^3SiO$ units where the R to Si ratio varies from 1.2 to 2.7; (c) a polymer of the formula:

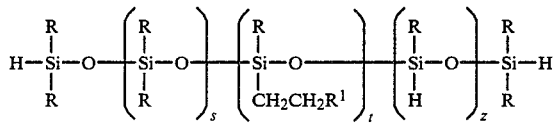

where R is alkyl of from 1 to 8 carbon atoms or phenyl, $R^1$ is perfluoroalkyl of from 1 to 8 carbon atoms, s is at least 1, t and z may be zero or a positive integer and the viscosity or the polymer varies from 10 to 1,000 centipoise at 25° C., where the concentration of siloxy units taken t times varies from 0 to 75 mole percent, and $R^3$ is alkyl of 1 to 8 carbon atoms, or —$CH_2CH_2R^1$; or a mixture of (a), (b) and (c), the total composition (A) and (B) comprising per 100 parts by weight of a base polymer (i), from 0.1 to 50 parts per million of platinum catalyst (ii), and from 1 to 50 parts of cross-linking polymer (iii), the improvement wherein the cyclic trimer used in the preparation of said base polymer (i) contains no more than 1.0 weight percent of a difluoropropenyl-containing compound of the formula

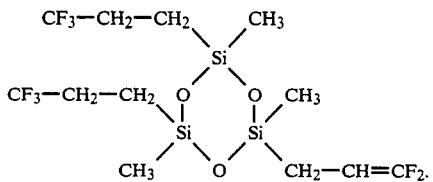

2. The composition of claim 1 which also includes from 5 to 100 parts of a filler which is selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

3. The composition of claim 2 wherein said filler is fumed silica, precipitated silica, each of which has been treated with a silicone compound, or a mixture thereof.

4. The composition of claim 1 wherein R is methyl, $R^1$ is $CF_3$, and $R^3$ is $-CH_2CH_2CF_3$.

5. The composition of claim 3 where the silicone compound is silazane.

6. The composition of claim 1 wherein the platinum catalyst is a platinum complex with an alcohol.

7. The composition of claim 1 wherein there is present in the total composition from 100 to 10,000 parts per million of a cure inhibitor selected from an organic hydroperoxide, dialkylmaleate, or dialkylmaleimide.

8. The composition of claim 7 wherein the cure inhibitor is dialkylmaleate.

9. The composition of claim 1 wherein the concentration of units taken y times in base polymer (i) varies from 26 to 29 mole percent.

10. The composition of claim 1 wherein the viscosity of polymer (i) is in the range of 20,000 to 85,000 centipoise at 25° C.

11. A process for forming a solvent resistant silicone elastomer comprising (a) mixing component (A) and component (B), (A) and (B) being as defined in claim 1, and (b) allowing the mixture to cure.

12. In a vinyl-terminated polymer prepared by copolymerization of methyl-3,3,3-trifluoropropyl-siloxane cyclic trimer and octamethylcyclotetrasiloxane, said polymer having a viscosity of from 1,000 to 200,000 centipoise at 25° C., the improvement wherein the cyclic trimer used in preparation of said polymer contains no more than 1.0 weight percent of a difluoropropenyl-containing compound of the formula

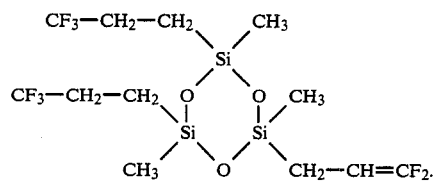

* * * * *

UNITED STATES PATENT OFFICE
CERTIFICATE OF CORRECTION

PATENT NO. : 4,585,848

DATED : 04/29/86

INVENTOR(S) E. R. Evans, M. Matsumoto

It is certified that error appears in the above-identified patent and that said Letters Patent are hereby corrected as shown below:

On the Title page insert
-- (73) Assignee: General Electric Company
Waterford, N. Y. --.

Signed and Sealed this

Twenty-eighth Day of October, 1986

[SEAL]

Attest:

DONALD J. QUIGG

Attesting Officer  Commissioner of Patents and Trademarks